March 22, 1927.

W. T. HENRY

MIRROR

Filed Jan. 15, 1926

1,622,114

Inventor
William T. Henry

By Hardway & Cather
Attorneys

Patented Mar. 22, 1927.

1,622,114

UNITED STATES PATENT OFFICE.

WILLIAM T. HENRY, OF LAKE CHARLES, LOUISIANA.

MIRROR.

Application filed January 15, 1926. Serial No. 81,431.

This relates to new and useful improvements in a mirror.

One object of the invention is to provide a mirror equipped with a novel form of mounting whereby the mirror may be readily attached to a smooth surface, as a window pane, and as readily detached. The type of mirror herein described is specially designed for use in shaving, and other facial treatments, where light is required and hence has been designed for easy attachment to a window pane.

Another object of the invention is to provide a mirror which may be readily adjusted, or turned, on its support so as to be readily tiltable to any angle desired.

With the above and other objects in view this invention has particular relation to certain novel features of construction, operation and arrangement of parts, an example of which is given in this specification and illustrated in the accompanying drawings, wherein.

Figure 1:
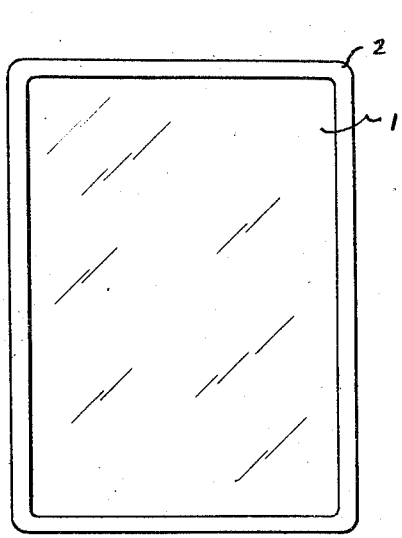
Figure 1 shows a front elevation.
Figure 3:
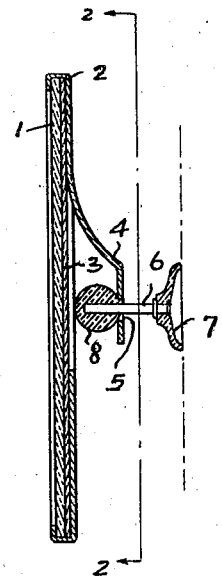
Figure 3 shows a sectional view on the line 3—3 of Figure 2.
Figure 2:
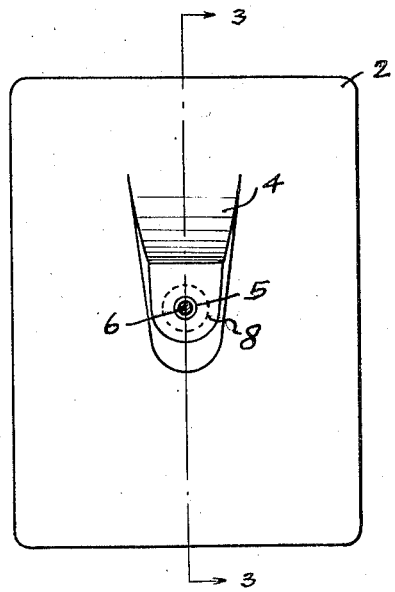
Figure 2 shows a rear view taken on the section line 2—2 of Figure 3.

Referring now more particularly to the drawings, wherein like numerals of reference designate similar parts in each of the figures, the numeral 1 designates a mirror which is mounted in a suitable casing, as 2, formed of thin metal, celluloid, or other suitable material. Between the metal case and the glass there is a ply of card board, as 3.

The back part of the casing has a flexible tongue 4, thrown out from the material thereof and whose outer end is bent into parallel relation with and spaced from the back of the mirror. This bent over portion of the tongue 4 has a bearing 5 to receive the stem 6. The outer end of this stem carries a vacuum cup 7, formed of rubber, or some similar flexible material and the inner end of the stem has a rubber ball 8 detachably secured thereto and which is clamped between the tongue 4 and the card board 3.

In use the mirror may be attached to a window pane or any plane surface by the vacuum cup 7, in accordance with the well known principle and the mirror may be readily turned to any desired angle and the friction of the ball against the back of the mirror will hold the latter in the desired position.

When the mirror is not in use the cup 7 may be detached, if desired, by detaching the stem 6, from the ball 8 and the mirror thus more conveniently carried, or stored away.

What I claim is:

1. The combination with a mirror, of a flexible tongue secured to the casing thereof and having a free end disposed substantially parallel with the mirror and spaced from the mirror and provided with a bearing, a stem fitted through said bearing, a friction member between the mirror and tongue, to which the stem is attached, and a vacuum cup secured to the outer end of the stem.

2. A mirror having a flexible tongue secured to the rear thereof, whose free end is disposed substantially parallel with the mirror and provided with a bearing, a stem fitted through said bearing, a vacuum cup attached to the outer end of the stem, the inner end of the stem having an enlarged head between the tongue and mirror.

3. A mirror having a flexible tongue secured to the rear thereof, whose free end is disposed substantially parallel with the mirror and provided with a bearing, a stem fitted through said bearing, a vacuum cup attached to the outer end of the stem, the inner end of the stem having an enlarged head between the tongue and mirror, said head being detachable from the stem.

In testimony whereof I have signed my name to this specification.

WILLIAM T. HENRY.